United States Patent [19]
Motoyama

[11] Patent Number: 5,113,829
[45] Date of Patent: May 19, 1992

[54] TWO CYCLE INTERNAL COMBUSTION ENGINE

[75] Inventor: Yu Motoyama, Iwata, Japan

[73] Assignee: Yamaha Hatsudoki Kabushiki Kaisha, Iwata, Japan

[21] Appl. No.: 508,924

[22] Filed: Apr. 12, 1990

[30] Foreign Application Priority Data

Apr. 13, 1989 [JP] Japan .................................. 1-91962

[51] Int. Cl.$^5$ .................... F02B 33/04; F02B 13/00
[52] U.S. Cl. .................... 123/431; 123/73 A; 123/73 C; 123/531
[58] Field of Search .............. 123/73 A, 73 B, 73 C, 123/73 CB, 431, 531

[56] References Cited

U.S. PATENT DOCUMENTS

| | | | |
|---|---|---|---|
| 4,080,949 | 3/1978 | Brinkman | 123/431 |
| 4,181,100 | 1/1980 | Yamane et al. | 123/431 |
| 4,572,133 | 2/1986 | Bago | 123/431 |
| 4,763,626 | 8/1988 | Staerzl | 123/73 A |
| 4,765,304 | 8/1988 | Brown | 123/73 CB |
| 4,779,581 | 10/1988 | Maier | 123/73 A |

FOREIGN PATENT DOCUMENTS 54-69607  6/1979  Japan .
61-279737 12/1986  Japan .

*Primary Examiner*—Willis R. Wolfe
*Attorney, Agent, or Firm*—Ernest A. Beutler

[57] ABSTRACT

A two cycle crankcase compression internal combustion engine having a main air/fuel injection system for injecting fuel and air directly into the combustion chamber and an auxiliary injection system for injecting fuel into the engine upstream of the combustion chamber for cooling the piston. A variety of arrangements of control strategies and auxiliary injection nozzle positions are illustrated and described.

46 Claims, 8 Drawing Sheets

5,113,829

TWO CYCLE INTERNAL COMBUSTION ENGINE

BACKGROUND OF THE INVENTION

This invention relates to a two cycle internal combustion engine and more particularly to an improved fuel injection system for such an engine.

It has been recognized, almost since the inception of the internal combustion engine, that there are certain advantages in injecting fuel directly into the combustion chambers either alone or along with high pressure air. Such injection systems tend to improve the distribution of the fuel within the combustion chamber and also can provide better control, under some instances, of the fuel/air ratio within the combustion chamber and the residual charge. The latter advantage is particularly useful in conjunction with two cycle internal combustion engines wherein there must be large degrees of overlap between the opening of the scavenge ports and the closing of the exhaust ports. By employing a fuel injection system directly into the combustion chamber, it can be insured that there will be good scavenging while insuring against the loss of unburned fuel into the exhaust system. However, there are some disadvantages to the use of direct fuel injection, particularly in two cycle internal combustion engines Because of the fact that the engine has a firing impulse for each revolution of the crankshaft, the heat loading on certain components such as the pistons are higher than with four cycle engines. When all of the fuel is introduced directly into the combustion chamber, there is no cooling of the piston by the admission of fuel and air into the crankcase chamber and then transfer into the combustion chamber, as is typical with two cycle engines wherein the fuel/air charge is introduced into the crankcase chamber. The discharge of fuel into the crankcase chamber tends to cool the pistons because of the evaporation of the fuel and other factors.

In addition, it is difficult to provide adequate fuel/air ratio control with a fuel/air injection system under all running and load conditions. That is, if the injection system is designed so as to provide all of the necessary fuel for high speed running, the engine will tend to run rich at low speeds since it is difficult to accurately maintain the amount of fuel discharge at low speeds through a single air/fuel injection nozzle.

It is, therefore, a principal object of this invention to provide an improved fuel injection system for an engine.

It is a further object of this invention to provide an improved fuel/air injection system for a two cycle internal combustion engine operating on the crankcase compression principle.

It is yet another object of this invention to provide an improved fuel injection system for a two cycle engine that embodies direct injection but wherein the piston and other associated components will be cooled under all running conditions.

It is a further object of this invention to provide an improved and simplified air/fuel injection system that will provide accurate and proper air/fuel ratio controls under all running conditions at a relatively low cost.

SUMMARY OF THE INVENTION

This invention is adapted to be embodied in a fuel injection system for an internal combustion engine operating on the two stroke crankcase compression principle. In accordance with the invention, a fuel injector is provided for injecting fuel directly into the combustion chamber under at least some running conditions. In addition, a fuel injection system is provided for injecting fuel into the engine upstream of the combustion chamber under at least some running conditions.

DETAILED DESCRIPTION OF THE PREFERRED EMBODIMENTS OF THE INVENTION

Figure 1:
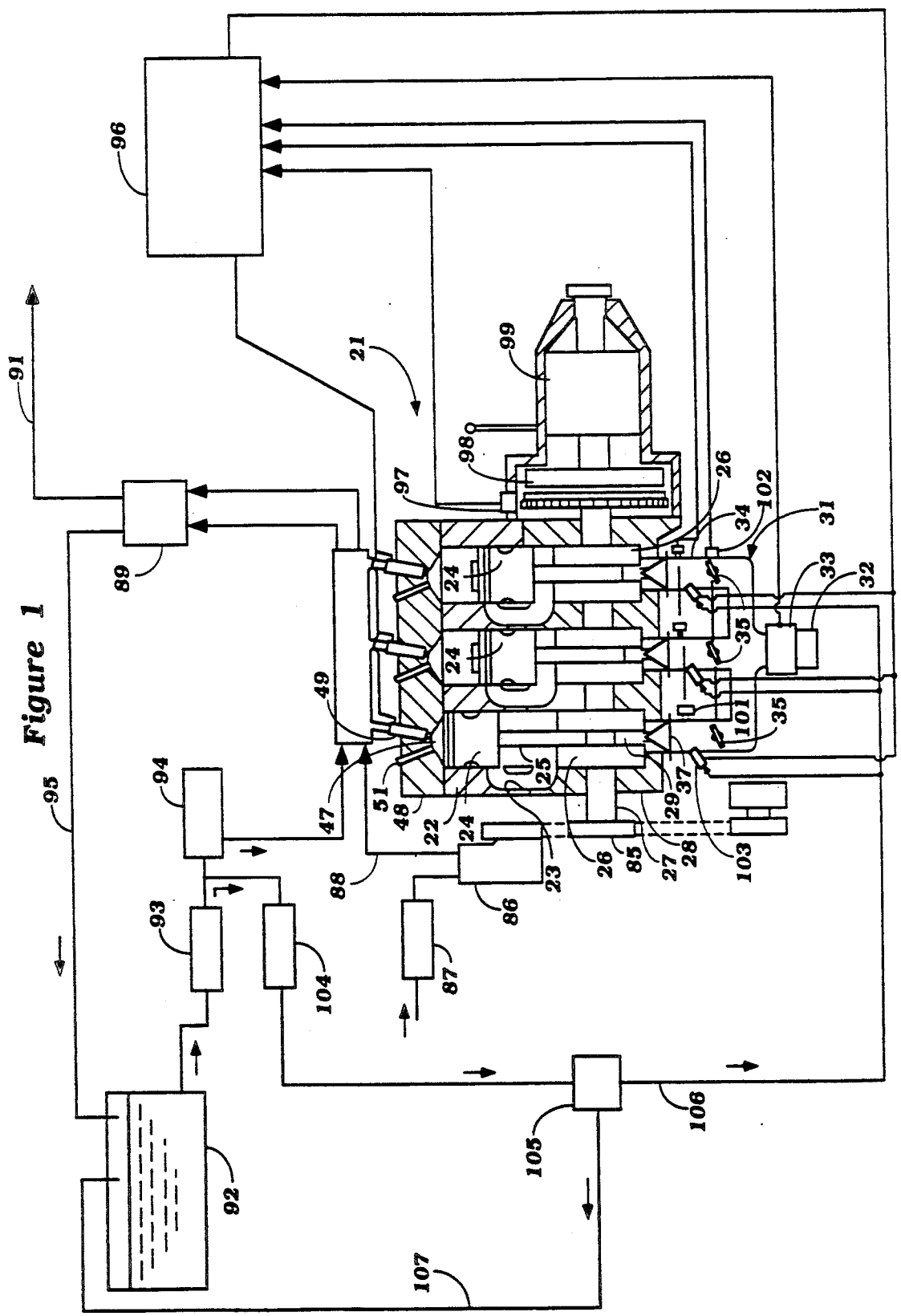
FIG. 1 is a longitudinal cross sectional view of an internal combustion engine constructed in accordance with an embodiment of the invention, with certain auxiliary components shown schematically.
Figure 2:
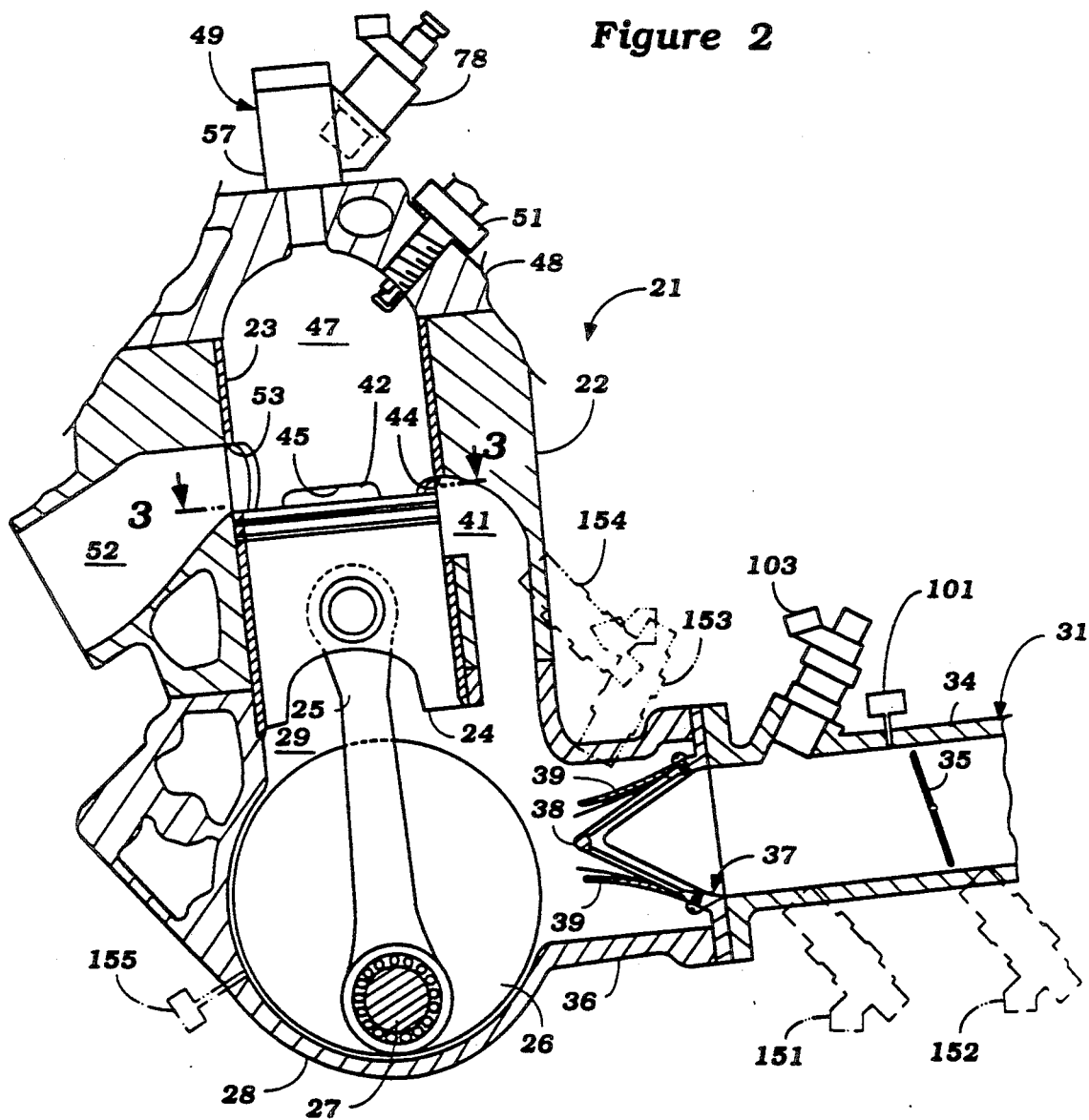
FIG. 2 is an enlarged cross sectional view taken through one of the cylinders of the engine along a plane extending transverse to the plane of FIG. 1.
Figure 3:
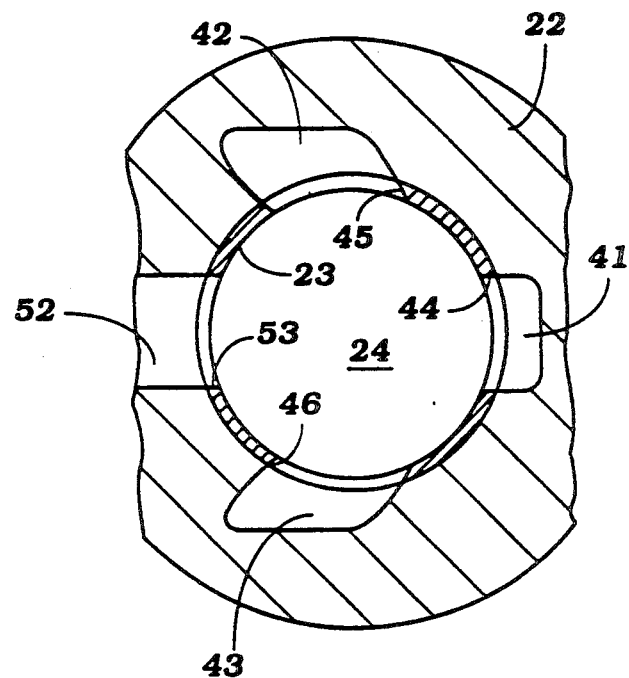
FIG. 3 is a cross sectional view taken along the line 3—3 of FIG. 2.

Referring now in detail to the drawings and initially primarily to FIGS. 1 through 3, the invention is depicted as being applied to a three cylinder in line two cycle crankcase compression internal combustion engine indicated generally by the reference numeral 21. Although the invention is described in conjunction with a three cylinder in line engine, the invention obviously has utility with engines having other configurations and, in fact, rotary rather reciprocating engines. Also, although the invention has particular utility with two cycle crankcase compression engines, certain facets of the invention can be utilized in conjunction with engines operating on the four stroke cycle.

The engine 21 is comprised of a cylinder block 22 in which are formed three aligned bores 23 by means of pressed in cylinder liners. Pistons 24 reciprocate within the cylinder bores 23 and are connected by means of connecting rods 25 to the individual throws 26 of a crankshaft 27. The crankshaft 27 is rotatably journaled within a crankcase 28 by means of a known type of bearing arrangement. As is typical with two cycle engine practice, the crankcase 28 is provided with a seal so as to form individually sealed crankcase chambers 29 each associated with a respective one of the cylinder bores 23.

Figure 4:
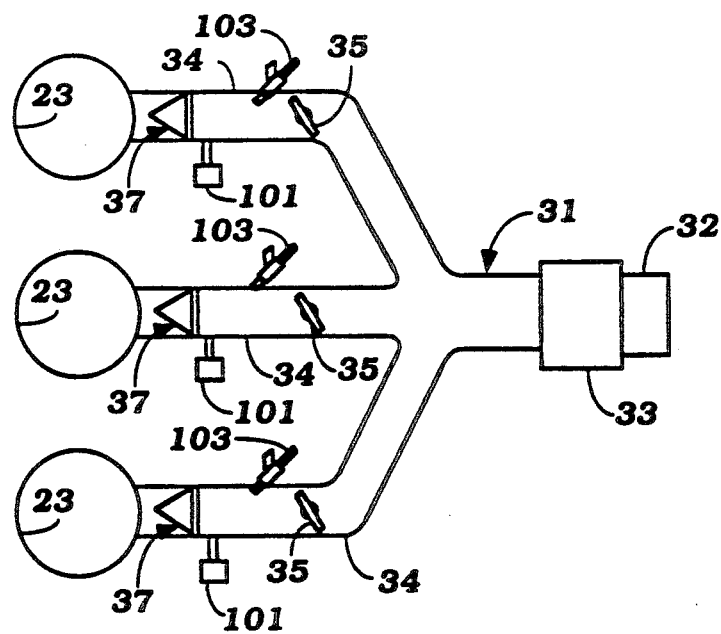
FIG. 4 is a schematic view showing the air induction system for the engine and the auxiliary fuel injection system.

An air charge is delivered to each of the crankcase chambers 29 by means of a manifold system, indicated generally by the reference numeral 31 and shown schematically in FIG. 4. The manifold 31 has an inlet portion 32 that is communication with an air cleaner (not shown) and which supplies air to an air flow detecting device 33 of a known type. The air flow detecting device 33 measures the amount of air flowing to the engine, for a reason which will be described. The manifold 31 then has three branch portions 34 in which individual throttle valves 35 are supported for controlling the flow therethrough. The throttle valves 35 are linked together by a suitable linkage system (not shown) so as to operate in unison.

Downstream of the throttle valves 36, the manifold branches 34 communicate with an inlet pipe 36 of the crankcase 28 wherein a reed type check valve assembly 37 is provided so as to preclude against reverse flow from the crankcase chambers 29 back into the induction system when the pistons 24 are descending and compressing the charge therein. The reed type check valves 37 include a cage portion 38 and a pair of reed type flapper valves 39.

The charge which has been introduced into the crankcase chambers 29 through the induction system as thus far described is compressed, as aforenoted, and then is transferred to the area above the pistons 24 through a plurality of scavenge ports 41, 42 and 43 (FIG. 3) that are formed circumferentially around the cylinder bore 23. These scavenge passages have respective ports 44, 45 and 46 that communicate the transferred charge with a combustion chamber, indicated generally by the reference numeral 47 which is formed by the head of the piston 24, the cylinder bore 23 and a cylinder head 48 that is affixed to the cylinder block 22 in a known manner.

A fuel/air charge is introduced to the combustion chamber 47 during at least some of the load and speed ranges by means of an air/fuel injector unit 49 having a construction which will be described later by reference to FIGS. 5 through 7. This charge is then fired by a spark plug 51 driving the pistons 25 downward. The burnt combustion products are then discharged through exhaust ports 52 formed in the cylinder block 22 and which communicate with the combustion chamber 47 through exhaust port openings 53. Although the invention is described in conjunction with a fuel/air injection unit, it may also be used in conjunction with an injector which injects only fuel directly into the combustion chamber.

Figure 5:
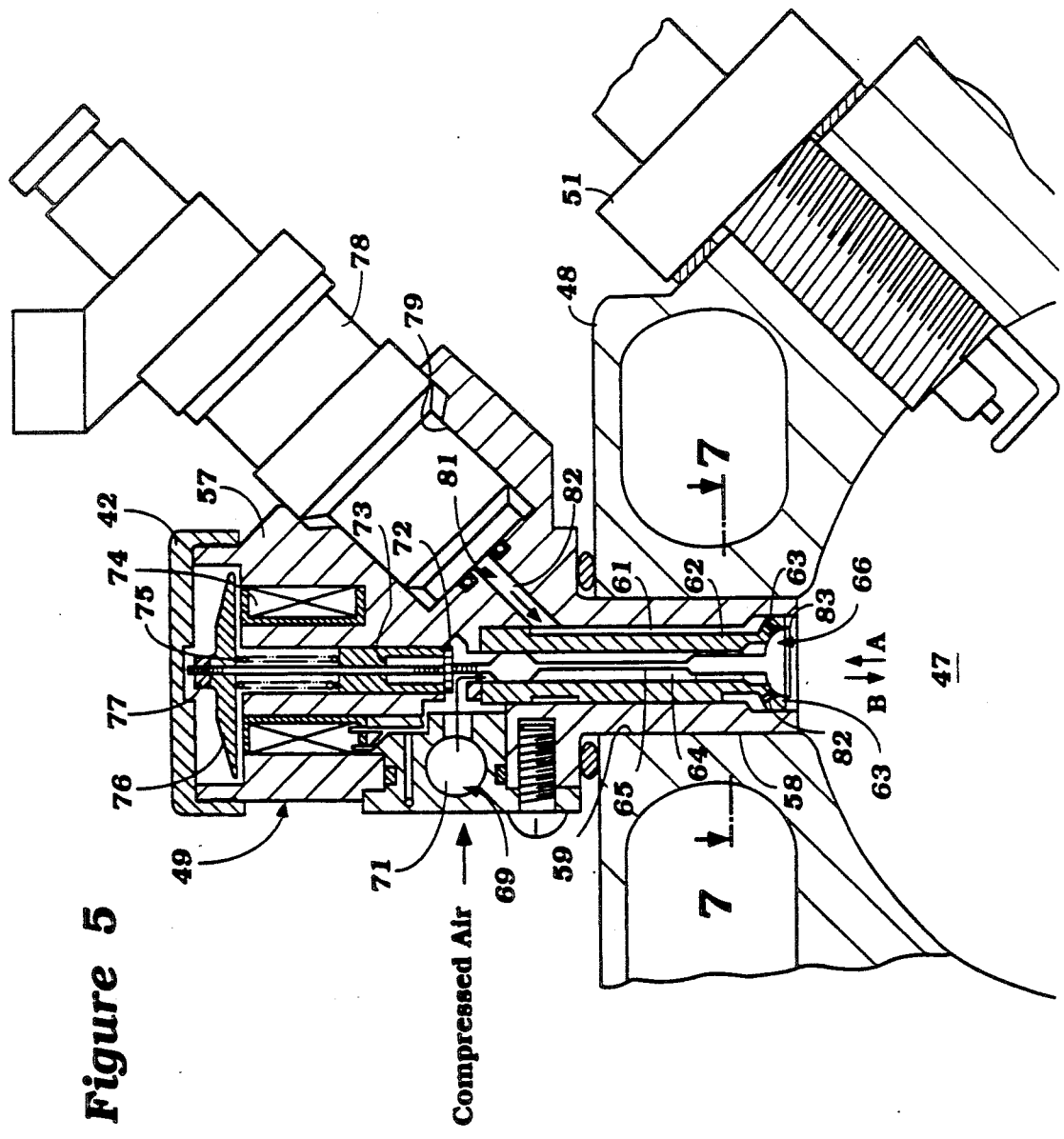
FIG. 5 is an enlarged cross sectional view showing one of the air/fuel injectors for the engine and its association with the combustion chamber.
Figure 6:
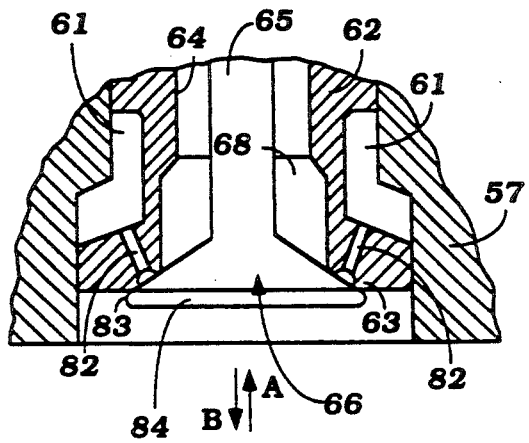
FIG. 6 is a further enlarged cross sectional view taken through the delivery valve of the injection nozzle.
Figure 7:
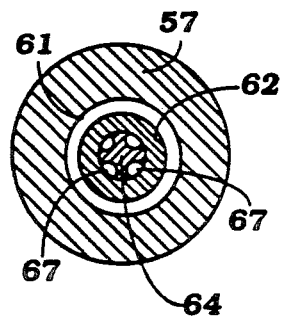
FIG. 7 is an enlarged cross sectional view taken along the line 7—7 of FIG. 5.

Referring in detail primarily to FIGS. 5 through 7, the injection unit 49 includes a main body portion 57 that has a nozzle part 58 that is threaded into a tapped bore 59 of the cylinder head 48. A through bore is formed in the nozzle part 58 and defines an annular cavity 61. The cavity 61 is isolated by a seat insert 62 that is formed with a valve seat portion 63 as best seen in FIG. 6.

The insert 62 is formed with a bore 64 in which a stem portion 65 of an injection control valve, indicated generally by the reference numeral 66, is slidably supported. The injection valve has enlarged portions that nevertheless define flow passages 67 (FIG. 7) so that air, as will be described, can flow into the bore 64 and a chamber 68 formed by the valve insert 62 adjacent the seat portion 63. This air is delivered through an air manifold, indicated generally by the reference numeral 69 that terminates in a passageway 71 which communicates with the bore 64 as shown by the arrow in FIG. 5.

The valve stem 65 is connected by means of a nut 72 to an armature 73 of an electromagnet assembly that is contained within the upper portion of the housing 57. This electromagnet assembly includes a winding 74 that has terminals which are energized in a suitable manner. A coil compression spring 75 engages an armature plate 76 that is held on an extension of the valve stem 65 by means of a nut 77 for urging the injection valve 66 to its closed position. When the winding 74 is energized, the armature disk 76 will be drawn downwardly and the valve 66 will be opened as shown by the arrow B.

A fuel injector 78 is contained within a bore 79 formed at one side of the housing 57 and which communicates with a fuel delivery passageway, indicated generally by the reference numeral 81 and including a passage 82 that interconnects the bore 79 with the recess 61. At the lower end, the area 61 is formed with a plurality of ports 82 that terminate in the valve seat 63 inwardly of the outer periphery 83 of the head 84 of the valve 66. As a result, when the valve head 84 moves to its open position, fuel can be injected and will be atomized by the air flow passing this area. Thus, fuel atomization will be achieved and the single valve head and valve seat control the flow of both fuel and air.

The system for supplying fuel to the injection nozzle 78 of the air/fuel injector 49 and air to the air manifold 71 will be described by particular reference to FIG. 1. As shown schematically, the crankshaft 27 has affixed to its forward end a pulley 85 which drives an air compressor 86 that draws atmospheric air through an air filter 87 and compresses it for delivery to the manifold 71 through a conduit shown schematically at 88. A pressure regulator 89 has an air pressure regulating portion that maintains the desired air pressure in the manifold 69 and discharges excess air to the atmosphere through an atmospheric vent conduit 91 which may be suitably silenced.

Fuel for the fuel injector 78 is supplied from a fuel tank 92 through a fuel filter 93 and fuel pump 94. The fuel pressure is regulated also by the regulator 89 and excess fuel for regulation purposes is returned to the fuel tank 92 through a return conduit 95

The amount of fuel and air discharged is controlled by means of a controller shown schematically at 96 and which receives various input signals from the engine for this purpose. These signals include the air flow signal sensed by the air flow meter 32, and engine speed and crank angle position provided by a crank angle detector 97 which is positioned adjacent a clutch 98 that drives a change speed transmission 99 in a known manner. In addition, an induction system pressure sensor 101 outputs a signal indicative of induction system pressure downstream of the throttle valve 35 to the controller 96 for a purpose to be described. A throttle position sensor 102 will also output a throttle position indication to the controller 96 for a purpose to be described.

The air/fuel injection unit 49 operates in such a way that when the valve 66 is opened, both fuel and air flow will be controlled. The device is timed in such a way, as may be seen from FIGS. 8 and 9, so that the valve 66 opens and permits air flow before fuel injection from the nozzle 78 is started. As may be seen in FIG. 9, there is a fixed offset or time delay t1 after the air flow begins before fuel injection is started. In a similar manner, fuel injection is stopped at a predetermined time t2 before the valve 66 is closed. This avoids the likelihood of any residual fuel being trapped in the system.

Figure 8:
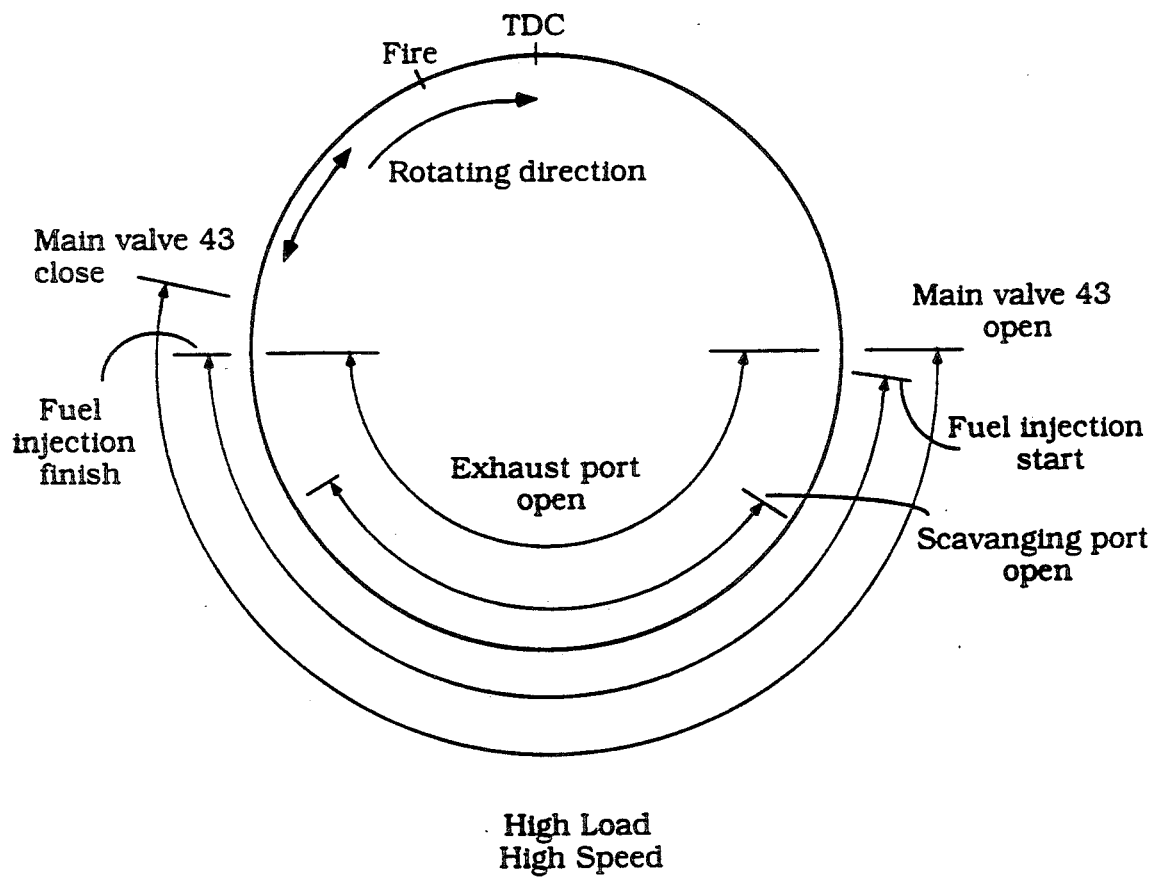
FIG. 8 is a timing diagram showing the valve port events and the fuel injection cycle during a phase of the engine operation.
Figure 9:
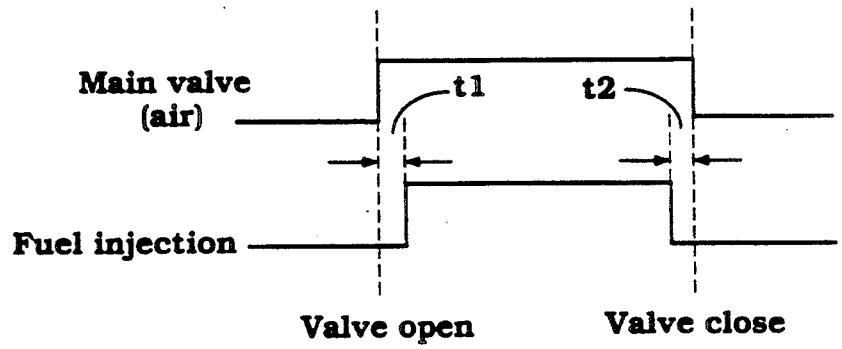
FIG. 9 is a time diagram showing the timing of the fuel injection and air injection of the fuel/air injection nozzle.

FIG. 8 also shows the high load high speed timing of the system and the relationship of fuel injection and air injection relative to the opening of the exhaust and intake ports. Basically, air injection is started at about the time the exhaust port opens and fuel injection is started some time later, but before the scavenge ports open. The fuel injection is stopped approximately at the time the exhaust port closes while the air injection is stopped sometime after this under this load range.

For the reasons aforenoted, it is desirable if the injection unit 49 does not supply all of the fuel requirements for the engine. For this purpose, additional injection nozzles 103 are provided which, in the illustrated embodiment, are disposed in the manifold runners 34. The nozzles 103 receive fuel from the main fuel tank 92 after it has passed through the filter 93. An additional fuel pump 104 pressurizes fuel to a pressure set by a regulator 105 for supply through a supply conduit 106 to the injectors 103. The regulated pressure is maintained by bypassing fuel through a conduit 107 back to the tank. The injectors 103 are also controlled by the controller 69 through a strategy which will now be described by particular reference to FIGS. 10 and 11.

Figure 10:
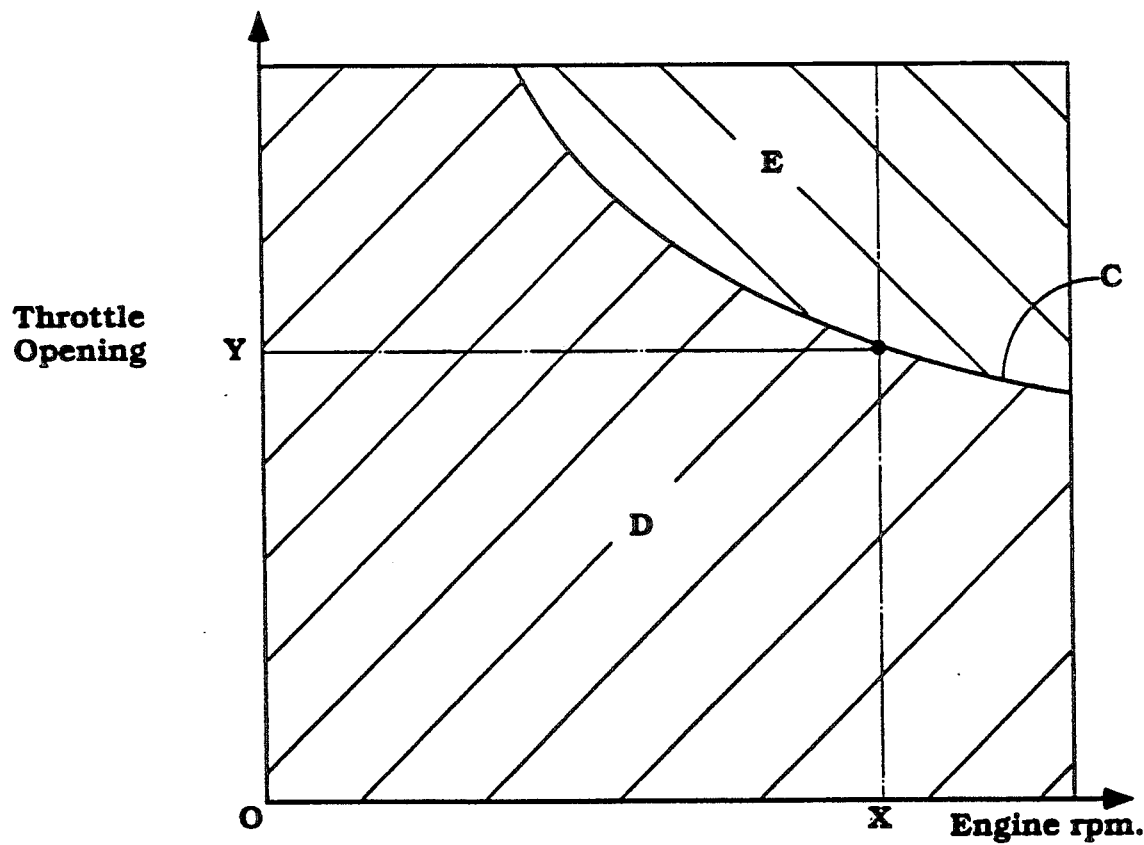
FIG. 10 is a graphic view showing how the fuel is supplied to the engine by the induction system during the load and speed ranges in accordance with an embodiment of the invention.
Figure 11:
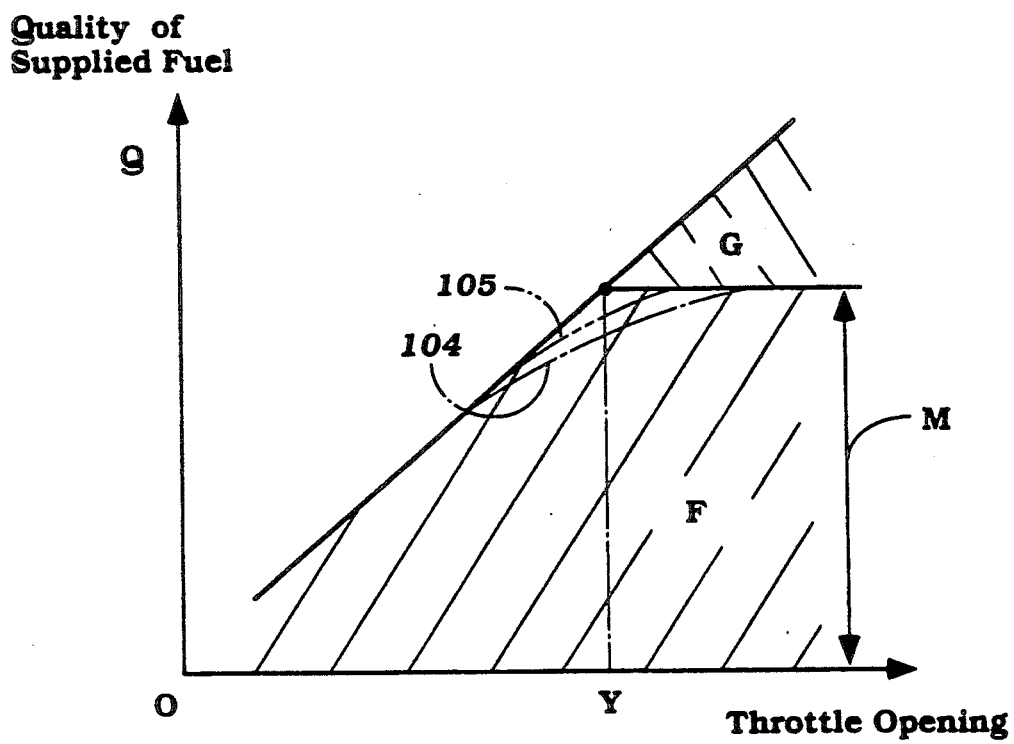
FIG. 11 is a graphic view showing the fuel supply in relation to throttle opening in conjunction with this embodiment of the invention.

FIG. 10 shows the relationship of throttle opening and engine speed throughout the entire engine operating range as shown by the block rectangle. FIG. 11 shows the amount of fuel supplied Q in relation to throttle opening. Basically the strategy in connection with this embodiment is that the low and medium to high speed fuel/air supply requirements for the engine are supplied by the air/fuel injector unit 49 with maximum load requirements being additionally supplied by the operation of the injection nozzle 103. Since the injection nozzle 103 sprays into the pressurized area, the air pressure signal from the sensor 101 is employed by the controller 96 so as to insure that the fuel pressure will always exceed the air pressure by a certain magnitude.

As may be seen by the curved line C in FIG. 10, the fuel supplied by the main injection nozzle D supplies the low speed low throttle opening requirements of the engine. However, as the throttle opening reaches a point determined by engine speed, the injection nozzle 103 will be energized so as to supply additional fuel as shown in the area E in FIG. 10. The effect is that the auxiliary fuel from the injection nozzle is introduces at progressively lower points on the torque curve as the engine speed increases as noted by the curvature of the line C.

Basically, one strategy employed may be that the throttle opening up to the point Y is supplied solely by the air/fuel injection unit 49 up until the maximum discharge M of this unit. Then additional fuel G is supplied by the injectors 103. Of course, rather than having an abrupt transition in the change of delivery, the transition may be more gradual as shown by the dot-dash line 104 or the dash-dot-dot-dash line 105.

Because the unit 49 operates at all engine speed and load ranges, the unit can operate and no carbon build up problems are likely to ensue on the head of the valve or adjacent the seat 63. Also, as the load on the engine increases, the delivery of fuel to the crankcase chambers by the auxiliary injectors 103 will serve to cool the pistons 24, thus relieving their thermal load. The throttle position detectors 102 are employed in conjunction with the controller 96 so as to determine when the injection nozzle 103 will begin to operate. In this regard, throttle position determined by the sensors 102 is similar to the air flow as measured by the air flow sensor 33.

In addition to the injection nozzle position for the auxiliary nozzles 103 shown in solid line in FIG. 2, alternate locations are also shown by the phantom positions 151 and 152 which are downstream and upstream of the throttle valve 35 and the manifold runners 34, respectively. Also, it is possible to discharge directly into the crankcase chambers 29 by the position shown in phantom at 153 or into the scavenge passages 41 as shown by the phantom line position 154. When these locations are employed, then the pressure sensor 101 should sense crankcase pressure 29 downstream of the check valve 37. Such a pressure sensor location is shown at 155.

It should be noted that the positioning of the injector nozzles 103 at either the solid line position shown in FIG. 2 or the positions shown in phantom at 151 and 152 will cause fuel to be injected upstream of the check valve. Hence the valve plates 39 will be wetted. This will reduce the opening and closing noise generated at high speeds. Thus, this particular location is especially advantageous for this purpose.

In the embodiments of the invention as thus far described and in those which will be hereinafter described, the auxiliary injection nozzles inject only fuel. It is to be understood, however, that these may also comprise air/fuel injection units like those shown in FIGS. 5 through 7 or other air/fuel injection units of that type.

Figure 12:
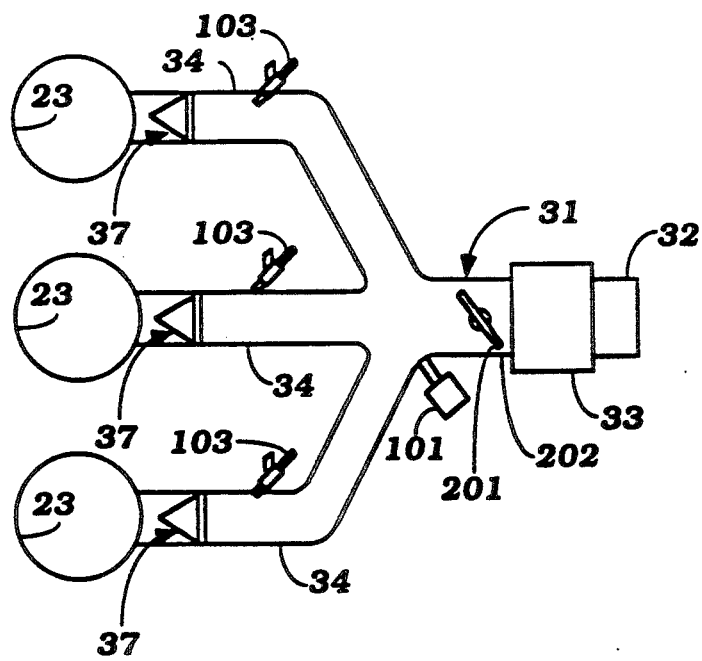
FIG. 12 is a partially schematic view, in part similar to FIG. 4, of another embodiment of the invention.

In the embodiments of the invention as thus far described, there have been provided individual throttle valves 35 in each of the manifold runners 34. Such an arrangement is useful in providing high performance for the engine. However, it also complicates the engine. FIG. 12 shows another embodiment of the invention which is generally the same as the embodiment as thus far described. In this embodiment, however, a single throttle valve 201 is positioned in a common portion 202 of the manifold 31 immediately downstream of the air flow detecting device 33. In other regards, this embodiment is the same as that previously described. For that reason, the components which are the same have been identified by the same reference numerals and will not be described again in detail.

Figure 13:
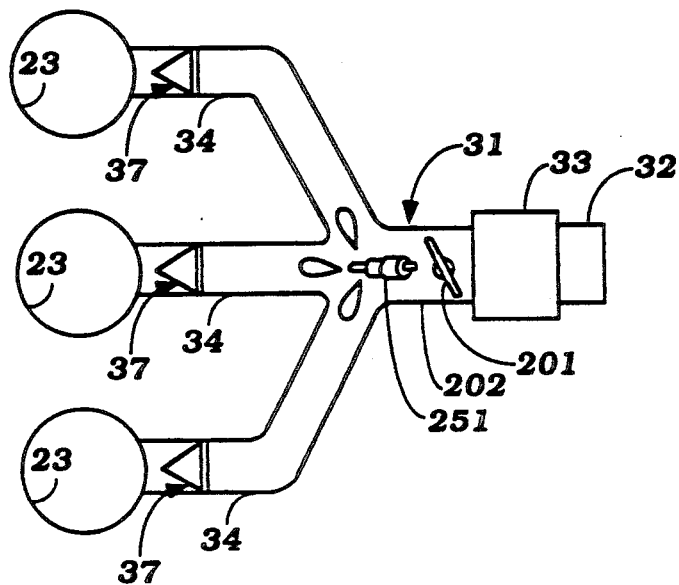
FIG. 13 is a schematic view, in part similar to FIGS. 4 and 12, of yet another embodiment of the invention.

FIG. 13 shows another embodiment of the invention which is generally similar to the embodiment of FIG. 12 but offers a further simplification. In this embodiment, a single auxiliary injection nozzle 251 is positioned in the common manifold section 202 downstream of the throttle valve 201. This injection nozzle 251 supplies all of the manifold runners 34 and thus provides a simpler construction but also requires an auxiliary injection nozzle of greater capacity.

Figure 14:
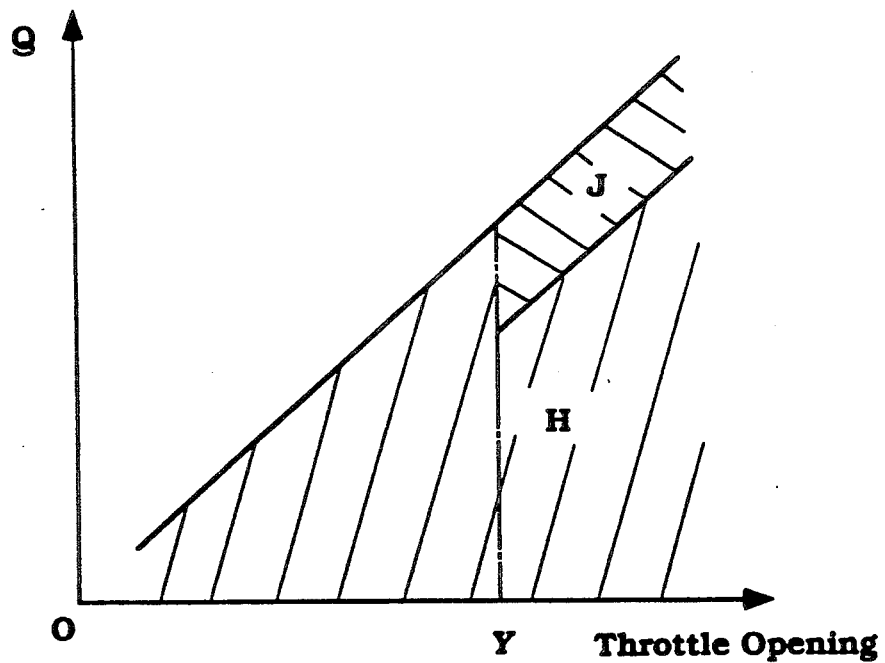
FIG. 14 is a graphic view, in part similar to FIG. 11, showing another arrangement in which the fuel delivery between the main and auxiliary injection nozzles is proportioned.

In the embodiments of the invention as thus far described, the strategy for operation of the auxiliary injection nozzles has been such that they operate primarily to supplement the output of the main air/fuel injection unit 49 when it reaches its maximum capacity. However, other arrangements are possible. FIG. 14 shows an embodiment wherein the discharge of the auxiliary injection nozzles is held constant after a given throttle opening at the point Y so that the auxiliary injection nozzles always supply a constant amount of fuel shown by the block J. This can simplify the construction and controlling for the auxiliary injection system.

It should be readily apparent from the foregoing description that a number of embodiments of the invention have been illustrated and described, each of which provides good running of the engine under all conditions through the use of an air fuel injection system that is supplemented by an auxiliary injection system wherein fuel is injected not directly into the combustion chamber, but upstream of it so that the piston and other components of the engine can be cooled. Although various control strategy have been described, still further control strategies or other modifications may be made without departing from the spirit and scope of the invention, as defined by the appended claims.

I claim:

1. A fuel injection system for an internal combustion engine comprising a fuel injector for injecting at least fuel directly into a combustion chamber of the engine under at least some running conditions, an induction system for delivering a charge to said combustion chamber, a throttle valve for controlling the flow through said induction system, and an auxiliary fuel injection system for injecting fuel into said induction system upstream of said throttle valve under at least some running conditions.

2. A fuel injection system as set forth in claim 1 wherein the auxiliary fuel injection system injects fuel into an intake manifold of the engine.

3. A fuel injection system as set forth in claim 2 wherein the engine is a two cycle crankcase compression engine and the intake manifold communicates with the crankcase chamber of the engine.

4. A fuel injection system as set forth in claim 3 further including a reed type check valve interposed between the intake manifold and the crankcase chamber.

5. In a fuel injection system for a two cycle crankcase compression engine comprising a fuel injector for injecting at least fuel directly into a combustion chamber of the engine under at least some running conditions, and an auxiliary fuel injection system for injecting fuel into the engine upstream of the combustion chamber under at least some running conditions, said fuel injector injecting fuel throughout the entire engine load and speed ranges.

6. In a fuel injection system as set forth in claim 5 wherein the auxiliary fuel injection system supplies additional fuel under certain running conditions.

7. In a fuel injection system as set forth in claim 6 wherein the auxiliary fuel injection system supplies fuel only at the high range of the engine.

8. In a fuel injection system as set forth in claim 7 wherein the auxiliary fuel injection system introduces auxiliary fuel at progressively lower points on the engine torque curve as engine speed increases.

9. In a fuel injection system as set forth in claim 7 wherein the auxiliary fuel injection system supplies a constant amount of fuel during the entire load range which it serves.

10. In a fuel injection system for an internal combustion engine comprising a fuel injector for injecting at least fuel directly into a combustion chamber of the engine under all running conditions, and an auxiliary fuel injection system for injecting fuel into the engine upstream of the combustion chamber only under high pressure conditions.

11. In a fuel injection system as set forth in claim 10 wherein the auxiliary fuel injection system introduces auxiliary fuel at progressively lower points on the engine torque curve as engine speed increases.

12. In a fuel injection system as set forth in claim 10 wherein the auxiliary fuel injection system supplies a constant amount of fuel during the engine load range which it serves.

13. In a fuel injection system as set forth in claim 10 wherein the auxiliary fuel injection system supplies fuel to the engine under running conditions when the fuel injector has substantially reached its fuel flow capacity.

14. In a fuel injection system as set forth in claim 10 wherein the auxiliary fuel injection system injects fuel into the intake manifold of the engine.

15. In a fuel injection system as set forth in claim 14 wherein the engine is a two cycle crankcase compression engine and the intake manifold communicates with the crankcase chamber of the engine.

16. In a fuel injection system as set forth in claim 15 further including a reed type check valve interposed between the intake manifold and the crankcase chamber.

17. In a fuel injection system as set forth in claim 16 wherein the additional fuel injector sprays fuel upstream of the reed type check valve.

18. A fuel injection system for a two cycle, crankcase compression internal combustion engine comprising a combustion chamber and an induction system for delivering a charge to said combustion chamber and including a crankcase chamber, a fuel injector for injecting at least fuel directly into said combustion chamber of the engine under at least some running conditions, and an auxiliary fuel injection system for injecting fuel into said engine induction system at a point so that fuel will be present in said crankcase chamber for cooling under at least some running conditions, said fuel injector and said auxiliary fuel injector both supplying fuel under at least one running condition of said engine.

19. A fuel injection system as set forth in claim 18 wherein the auxiliary fuel injection system supplies fuel to the engine under running conditions when the fuel injector has substantially reached its fuel flow capacity.

20. A fuel injection system as set forth in claim 18 wherein the induction system further comprises scavenge passage means extending from the crankcase chamber to the combustion chamber and communicating with the combustion chamber during portions of the cycle of operation.

21. A fuel injection system as set forth in claim 20 wherein during the running condition of the engine when both the fuel injector and the auxiliary fuel injector are supplying fuel the fuel injector supplies fuel during the time when the scavenge passage means is communicating with the combustion chamber for improving the mixture of fuel/air mixture in the combustion chamber.

22. A fuel injection system as set forth in claim 18 further including exhaust port mans for communicating with the combustion chamber and for discharging a combusted charge therefrom.

23. A fuel injection system as set forth in claim 22 wherein the fuel injector injects fuel into the combustion chamber at least in part during the time when the exhaust port means is open during running conditions when the fuel injector and the auxiliary fuel injector are both supplying fuel to the engine.

24. A fuel injection system as set forth in claim 18 wherein the auxiliary fuel injection system injects fuel into an intake manifold of the engine which serves the crankcase.

25. A fuel injection system as set forth in claim 24 wherein the engine has multiple combustion chambers all served by a common intake manifold and wherein the auxiliary fuel injector injects fuel into a common portion of said intake manifold for supplying all of the combustion chambers and wherein each combustion chamber is provided with a fuel injector.

26. In a fuel injection system as set forth in claim 24 further including a reed type check valve interposed between the intake manifold and the crankcase chamber.

27. In a fuel injection system as set forth in claim 26 wherein the additional fuel injector sprays fuel upstream of the reed type check valve.

28. A fuel injection system as set forth in claim 27 wherein the fuel injector injects fuel and compressed air.

29. A fuel injection system as set forth in claim 28 wherein the auxiliary fuel injector injects only fuel.

30. In a fuel injection system as set forth in claim 27 further including a throttle valve for controlling the flow through the intake manifold.

31. In a fuel injection system as set forth in claim 30 wherein the auxiliary fuel injector sprays fuel upstream of the throttle valve.

32. In a fuel injection system as set forth in claim 30 wherein the auxiliary fuel injector sprays fuel downstream of the throttle valve.

33. A fuel injection system as set forth in claim 30 further including a throttle valve for controlling the flow through the intake manifold.

34. A fuel injection system as set forth in claim 33 wherein the auxiliary fuel injector sprays fuel upstream of the throttle valve.

35. In a fuel injection system as set forth in claim 18 wherein the injector injects both fuel and air directly into the combustion chamber.

36. In an outboard drive as set forth in claim 35 wherein the engine is of the two cycle crankcase compression type.

37. In an outboard drive as set forth in claim 36 wherein the auxiliary fuel injection system supplies fuel directly to the crankcase chamber.

38. A fuel injection system as set forth in claim 35 wherein the auxiliary fuel injection system injects fuel into the intake manifold of the engine.

39. In a fuel injection system as set forth in claim 38 wherein the engine is a two cycle crankcase compression engine and the intake manifold communicates with the crankcase chamber of the engine.

40. In a fuel injection system as set forth in claim 39 further including a reed type check valve interposed between the intake manifold and the crankcase chamber.

41. In a fuel injection system as set forth in claim 39 wherein the auxiliary fuel injector sprays fuel downstream of the throttle valve.

42. In a fuel injection system as set forth in claim 35 wherein the auxiliary fuel injector injects fuel and air throughout the entire engine load and speed ranges.

43. In a fuel injection system as set forth in claim 42 wherein the auxiliary fuel injection system supplies additional fuel under certain running conditions.

44. In a fuel injection system as set forth in claim 43 wherein the auxiliary fuel injection system supplies fuel only at the high range of the engine.

45. In a fuel injection system as set forth in claim 44 wherein the auxiliary fuel injection system introduces auxiliary fuel at progressively lower points on the engine torque curve as engine speed increases.

46. In a fuel injection system as set forth in claim 44 wherein the auxiliary fuel injection system supplies a constant amount of fuel during the entire load range which it serves.

* * * * *

UNITED STATES PATENT AND TRADEMARK OFFICE
CERTIFICATE OF CORRECTION

PATENT NO. : 5,113,829
DATED : May 19, 1992
INVENTOR(S) : Yu Motoyama

It is certified that error appears in the above-identified patent and that said Letters Patent is hereby corrected as shown below:

Column 7, line 67, Claim 10, "In a" should be --A--.

Column 8, line 5, Claim 10, "pressure" should be --range--.

Column 8, line 14, Claim 13, "In a" should be --A--.

Column 8, line 18, Claim 14, "In a" should be --A--.

Column 8, line 64, Claim 22, "mans" should be --means--.

Column 10, line 28, Claim 42, "auxiliary" should be --air and--.

Signed and Sealed this

Twenty-sixth Day of October, 1993

Attest:

BRUCE LEHMAN

Attesting Officer

Commissioner of Patents and Trademarks